United States Patent [19]

Artigaud et al.

[11] Patent Number: 5,636,054
[45] Date of Patent: Jun. 3, 1997

[54] REGULATED OPTICAL AMPLIFIER HAVING AN OPTICAL CIRCULATOR

[75] Inventors: Serge Artigaud; Jean Hervo, both of Draveil; Pierre Sansonetti, Palaiseau, all of France

[73] Assignee: Alcatel N.V., Rijswijk, Netherlands

[21] Appl. No.: 534,209

[22] Filed: Sep. 26, 1995

[30] Foreign Application Priority Data

Sep. 29, 1994 [FR] France ................... 94 11639

[51] Int. Cl.$^6$ ............... G02F 1/39; H01S 3/06; H04B 10/17
[52] U.S. Cl. ............... 359/341; 359/134; 359/160; 359/337; 359/345; 385/1
[58] Field of Search ............. 359/134, 160, 359/187, 194, 337, 341, 345; 385/1

[56] References Cited

U.S. PATENT DOCUMENTS

| | | | |
|---|---|---|---|
| 5,239,607 | 8/1993 | da Silva et al. | 359/346 |
| 5,506,724 | 4/1996 | Shemizer et al. | 359/341 |
| 5,557,442 | 9/1996 | Huber | 359/179 |

FOREIGN PATENT DOCUMENTS

| | | |
|---|---|---|
| 2159426 | 3/1996 | Canada . |
| 0395277A1 | 10/1990 | European Pat. Off. . |
| 0566236A1 | 10/1993 | European Pat. Off. . |
| 2718588 | 10/1995 | France . |
| 2289978 | 12/1995 | United Kingdom . |

OTHER PUBLICATIONS

*Patent Abstracts Of Japan*, vol. 017 No. 453 (E–1417), 19 Aug. 1993 & JP-A-05 102583 (Sumitomo Electric Ind Ltd; Others: 02) 23 Apr. 1993.

*IEEE Photonics Technology Letters*, vol. 6, No. 2, Feb. 1994 New York US, pp. 202–204, XP 000439750, Y. Sato et al, "Noise figure monitoring of optical amplifiers via backward amplified spontaneous emission".

Clesca et al, Electron. Lett. (UK), vol. 30, #16, pp. 1308–1309, Aug. 4, 1994.

Bayart et al, OFC '96, vol. 2, Mar. 1996, pp. 157–158, IEEE Cat. No 96CH35901.

*Primary Examiner*—Nelson Moskowitz
*Attorney, Agent, or Firm*—Sughrue, Mion, Zinn Macpeak & Seas

[57] ABSTRACT

An optical amplifier of the type including an inlet for a light signal to be amplified and an outlet for an amplified light signal that has been amplified by means of an amplifying waveguide that is controlled by regulation light coming from a pumping diode; the amplifier comprising: an optical circulator having an inlet port receiving the light signal to be amplified, an outlet port delivering the amplified light signal, and two intermediate ports, the first of the intermediate ports being connected to the amplifying waveguide; and regulation means having an inlet connected to the second of the intermediate ports and an outlet connected to the pumping diode, whereby the amplifying waveguide has equalized gain for all of the carrier waves constituting the amplified light signal.

8 Claims, 1 Drawing Sheet

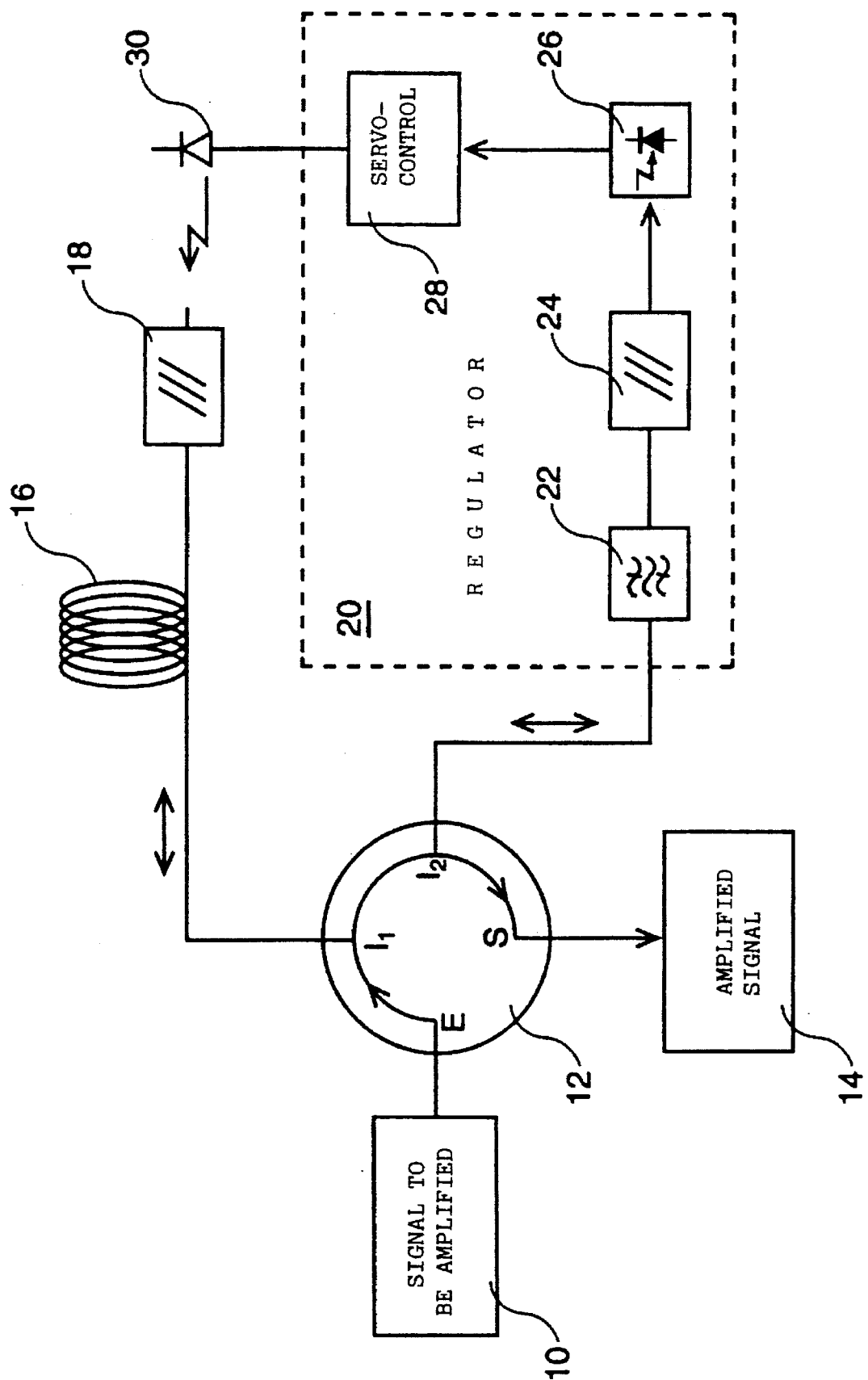

REGULATED OPTICAL AMPLIFIER HAVING AN OPTICAL CIRCULATOR

The present invention relates in general to optical fiber links for simultaneous transmission of information over a plurality of channels, and in particular it relates to a regulated optical amplifier including an optical circulator for equalizing gain over all of the channels of the optical link concerned.

BACKGROUND OF THE INVENTION

In an optical fiber link, it is conventional to use an amplifying waveguide whose gain is the same for all of the channels making up the link; that is to say the amplifying waveguide presents a characteristic known as gain "flatness".

Attempts have therefore been made to regulate the amplifying waveguide by inserting an optical isolator and/or filter in the amplifying waveguide. Unfortunately, various problems are encountered, such as weld losses and intrinsic loss of power due to the optical isolator.

Another solution, which constitutes the subject matter of our French patent application No. 94/00321, consists in inserting an optical coupler at the inlet to the amplifying waveguide in such a manner as to control the level at which amplified light is emitted by means of regulation light constituted by backward amplified spontaneous emission propagating in the direction opposite to the forward direction of the light in the optical fiber. That method nevertheless suffers from the problem of introducing power loss and above all the servo-control regulates power in the reverse direction and that is not necessarily an accurate image of the power in the forward direction.

OBJECTS AND SUMMARY OF THE INVENTION

That is why the main object of the invention is to provide an optical amplifier having gain that is flat over all of the channels of an optical link in spite of power variations of the light to be amplified.

The invention thus provides a regulated optical amplifier including an optical circulator having an inlet port for receiving the light signal to be amplified, an outlet port for providing the amplified light signal, and two intermediate ports: the first intermediate port being connected to an amplifying waveguide and the second intermediate port being connected to regulation means for controlling the amplifying waveguide.

BRIEF DESCRIPTION OF THE DRAWING

The objects, the subject matter, and the characteristics of the present invention will be better understood from the following description made with reference to the sole FIGURE which is a diagram of a preferred embodiment of the invention.

MORE DETAILED DESCRIPTION

In the sole FIGURE, a light signal to be amplified 10 coming from an emitter is made up of a plurality of carrier waves of different wavelengths. Thus, the carrier waves may have wavelengths spaced apart at 2 nm intervals in the 1550±10 nm wavelength band, thus giving rise to a 10-channel multiplex signal.

The signal to be amplified is delivered to an optical circulator via its inlet port E. The transmitted signal is amplified by an amplifying waveguide as explained below, and the amplified signal is obtained from the outlet port S of the optical circulator. It should be observed that optical circulators are well known in the art of optical fiber links and no further description is given in the context of the present invention.

The optical circulator has two intermediate ports I1 and I2. Light is taken off from the intermediate port I1 by means of an optical fiber and is delivered to an amplifying waveguide 16. Such an amplifying waveguide may advantageously be an optical fiber having an erbium-doped fluorine-containing matrix. However it could also be constituted by an erbium-doped silica fiber. When excited by a pumping wave, the dopant amplifies the light signal. The gain of the amplifier depends on a controlled characteristic of the pumping wave, which controlled characteristic is typically the power of said wave.

The amplifying waveguide 16 is followed by a photorefractive grating 18. The purpose of the photorefractive grating 18 is to reflect the amplified light signal and send it back to the optical circulator 12 via the optical fiber. Such a photorefractive grating, which in this case reflects 100% of the light, operates by periodic modification of refractive index within the optical fiber.

The second intermediate port I2 of the optical circulator 12 is connected to an optical fiber which takes off the light and delivers it to a servo-control loop 20. The purpose of such a servo-control loop is to obtain spectral flattening, i.e. to cause all of the gains applied to the various carriers in the signal multiplex to have the same value. This common gain value is generally referred to as "flat gain".

The servo-control loop includes a filter 22 whose purpose is to pass light belonging to only one or a few wavelengths lying in the middle of the spectrum of carrier waves making up the multiplex signal. The selected wavelength could be 1550 nm, for example.

The output from the filter 22 is transmitted to a photorefractive grating 24 of the same type as the abovementioned photorefractive grating 18, but one that allows a small percentage of the received light to pass through, e.g. 1%.

The photorefractive grating 24 is followed by a light detector 26 for detecting that portion of the light which is transmitted through the photorefractive grating 24. Such a light detector may advantageously be constituted by an avalanche type receiver diode which provides output in the form of an electrical signal which is a function of the received light.

The electrical signal delivered by the light detector 26 is then transmitted to a servo-control circuit 28 for delivering servo-controlled current to a pumping diode or light-emitting diode 30. The servo-control circuit 28 delivers more current or less current to the diode 30 depending on whether the electrical signal from the light detector 26 is less than or greater than a predetermined threshold which is a function of the gain to be obtained for the amplifying waveguide, i.e. the value of the current delivered to the diode is an inverse function of the electrical signal coming from the light detector 26.

Depending on the amount of current passing therethrough, the pumping diode 30 provides control light to the amplifying waveguide 16 in the form of a pumping wave that acts on the amplifying waveguide in known manner and as mentioned above. Since the gain of the amplifying waveguide depends on a characteristic of the pumping wave, and in the present case the power thereof which in turn depends on the current fed to the pumping diode, the gain of the amplifying waveguide is kept constant because the current delivered to the pumping diode is regulated by the amplified signal as detected by the light detector 26. The wavelength of the pumping wave emitted by the pumping diode 30 is different from that of the carrier waves of the signal to be amplified, and it may be 1480 nm, for example.

It should be observed that it matters little whether the filter 22 in the servo-control loop 20 is situated upstream or downstream from the photorefractive grating 24 since each of these two components acts on characteristics of the multiplexed signal that are independent.

We claim:

1. An optical amplifier of the type including an inlet for a light signal to be amplified and an outlet for an amplified light signal that has been amplified by means of an amplifying waveguide that is controlled by regulation light coming from a pumping diode; said amplifier comprising:

an optical circulator having an inlet port receiving said light signal to be amplified, an outlet port delivering said amplified light signal, and two intermediate ports, the first of said intermediate ports being connected to said amplifying waveguide; and regulation means having an inlet connected to the second of said intermediate ports and an outlet connected to said pumping diode, whereby said amplifying waveguide has equalized gain for all of the carrier waves constituting said amplified light signal.

2. An amplifier according to claim 1, in which said amplifying waveguide is constituted by an erbium-doped optical fiber.

3. An amplifier according to claim 1, in which said pumping diode delivers a pumping wave to excite the dopant of said amplifying waveguide at a power which is controlled by said regulation means as an inverse function of the power of the light signal received by said regulation means and coming from the second intermediate port of said optical circulator.

4. An amplifier according to claim 1, in which the outlet of said amplifying waveguide is connected to a first photorefractive grating which reflects 100% of the amplified light signal.

5. An amplifier according to claim 1, in which said regulation means includes a second photorefractive grating reflecting 99% of the received light.

6. An amplifier according to claim 5, in which said regulation means includes a light detector connected to the outlet of said second photorefractive grating to transform the 1% of the light signal that is not reflected by said second photorefractive grating into an electrical signal.

7. An amplifier according to claim 5, further including a filter designed to pass not more than a few wavelengths situated in the middle of the spectrum of the received light signal.

8. An amplifier according to claim 1, in which said signal to be amplified is a multiplex signal having wavelengths situated in the range 1550±10 nm.

\* \* \* \* \*